United States Patent [19]
Altheimer et al.

[11] Patent Number: 5,406,497
[45] Date of Patent: Apr. 11, 1995

[54] METHODS OF OPERATING CELL LIBRARIES AND OF REALIZING LARGE SCALE INTEGRATED CIRCUITS USING A PROGRAMMED COMPILER INCLUDING A CELL LIBRARY

[75] Inventors: Michel Altheimer, Antibes; Valery F. Gravoulet, Valbonne; Paul M. Holt, Antibes; Frank T. Riherd, Nice, all of France

[73] Assignee: VLSI Technology, Inc., San Jose, Calif.

[21] Appl. No.: 577,947

[22] Filed: Sep. 5, 1990

[51] Int. Cl.$^6$ ............................................... G06F 15/60
[52] U.S. Cl. .................................... 364/489; 364/488
[58] Field of Search ............... 364/488, 489, 490, 491, 364/578

[56] References Cited

U.S. PATENT DOCUMENTS

| | | | |
|---|---|---|---|
| T944,001 | 3/1976 | Hanan et al. | 364/490 |
| 4,263,651 | 4/1981 | Donath et al. | 364/491 |
| 4,703,435 | 10/1987 | Darringer et al. | 364/489 |
| 4,922,432 | 5/1990 | Kobayashi et al. | 364/490 |
| 4,924,430 | 5/1990 | Zasio et al. | 364/578 |
| 4,967,367 | 10/1990 | Piednoir | 364/490 |
| 5,005,136 | 4/1991 | Van Berkel et al. | 364/490 |

OTHER PUBLICATIONS

"Introduction to MOS LSI Design" by J. Mavor et al., Chapter 3.7, Addison–Wesley Publishers Limited, 1983, pp. 81–85.

Primary Examiner—Vincent N. Trans
Attorney, Agent, or Firm—Burns, Doane, Swecker & Mathis

[57] ABSTRACT

A method of operating a programmed synthesizer which provides from a specification of function defining a data processor a netlist constituting a technology mapping of the processor in terms of a selected technical realization includes storing in a data storage device a library comprising a multiplicity of sets of data each set of which defines a basic cell and operational parameters thereof, the method further comprising scaling said parameters and performing the realization of the processor employing the scaled parameters of selected cells. A suite of scaling factors is defined for the parameters of the cells in the library; and the selected processor is realized employing the selected cells parameters scaled according to said suite of scaling factors. The invention is useful when the operating conditions intended for the processor are different from those for which the parameters are specified.

16 Claims, 4 Drawing Sheets

SYMBOL

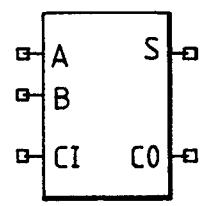
FIG. 3
FIG. 5
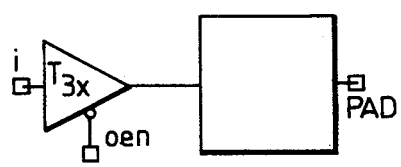
FIG. 4
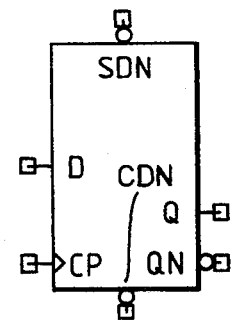
FIG. 4A
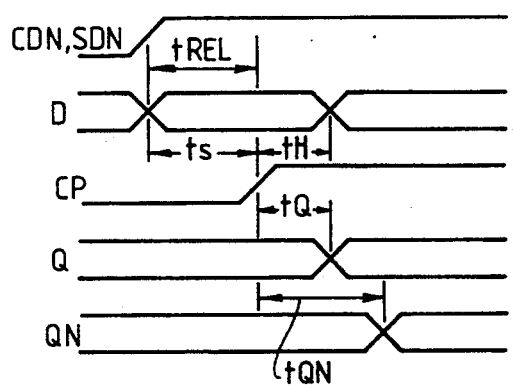
FIG. 5A
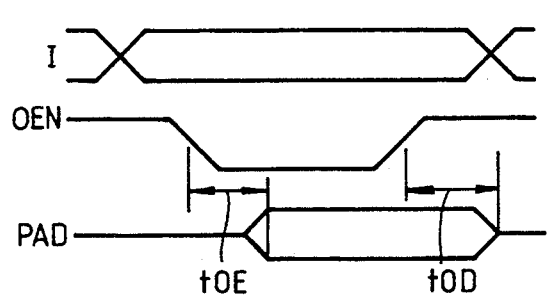
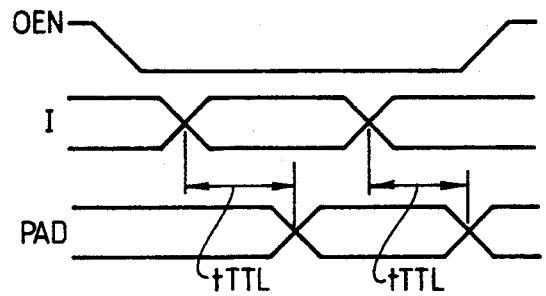

METHODS OF OPERATING CELL LIBRARIES AND OF REALIZING LARGE SCALE INTEGRATED CIRCUITS USING A PROGRAMMED COMPILER INCLUDING A CELL LIBRARY

BACKGROUND OF THE INVENTION

The present invention concerns the use of cell libraries in the design and fabrication of large scale integrated circuits with the aid of a programmed data processor, hereinafter called compiler, by means of which an operator initially specifies a function and achieves a detailed instruction for the layout of a large scale integrated circuit which implements, in the selected technical realisation, the function which has been specified by the operator. The invention more particularly relates to improved techniques for the scaling of cell parameters in such a library.

The design, checking and testing of large scale integrated circuits is so complex that the use of such a programmed data processor is essential for any normal circuit or function. This is partly because the digital signal processing functions are inherently complicated, partly because the main data processing functions need to be decomposed into simpler functions which are within the library of the processor and partly because considerable computation is required in order to achieve an efficient layout of the network. It will be understood that the result of the computerised design process is a detailed specification defining, in terms of a particular technology, a complex integrated circuit. Such a specification may be regarded as a template for the fabrication of the physical embodiment of the integrated circuit.

Compilers of the kind set forth above are commercially available and have been described in the literature. Reference may be made for example to Rabaey et al. "Cathedral—2: Computer Aided Synthesis of Digital Signal Processing Systems", Proceedings of the IEEE CICC 1987 pages 157–160 (1987), S. G. Smith and R. W. Morgan "High Level DSP ASIC Design Tool", Proceedings Euro—ASIC 1989 pages 117–129, Grenoble, France, January 1989; Hartley et al., "A Digit—Serial Silicon Compiler" Proceedings 25th ACM/IEEE DA Conference pages 646–649, California, June 1988; Proceedings of the 24th Design Automation Conference, Miami, Fla., June 1987; Proceedings of the International Workshop on Logic and Architectural Synthesis for Silicon Compilers, Grenoble, May 1988; Proceedings of the International Conference on Computer Aided Design, Santa Clara, Calif., November 1988; and IEEE Transactions on Computer Aided Design on Integrated Circuits and Systems, Volume CAD-5 Number 4, October 1986.

In the operation of a compiler or other generally similar programmed design tool, the operator generally commences with a specification of the function of, for example, a digital signal processor which is to be realised in the selected technology. The initial specification is normally independent of technology. It may be, for example, in the form of an icon network as discussed in U.S. patent application Ser. No. 425634 filed 23rd October 1989 by Stuart G. Smith et al. The machine proceeds to create a detailed netlist, that is to say a specification of the desired function of the processor in terms of standard components or cells. For this purpose the machine has recourse to a "library" of cells. Such libraries are well known and are commercially available.

An important stage in the synthesis of large scale integrated circuits is optimization under programmed control. This process is normally called netlist optimization. A process of logical synthesis may commence with the original functional statement of the circuit that is to be synthesized and followed with stages of minimization, factorisation and mapping. The last mentioned stage is a synthesis in terms of the basic circuits or cells which are maintained for access in a cell library. Before this stage is implemented the circuit which is to be synthesized is expressed in terms of logic, such as Boolean equations, in a manner which is independent of technology. In other words, it does not express the logic in terms of particular circuits which are dependent upon the choice of fabrication, such as CMOS (Complementary Metal Oxide Semiconductors) technology. The mapping process converts the logical representation which is independent of technology into a form which is dependent upon technology and which has recourse to standard circuits, or cells which are held within the cell library forming part of the data available to the data processor.

The mapping process is determined by algorithms which are generally based on three different strategies. These can be broadly characterised as minimization of area, minimization of total delay and minimization using an area-time objective function.

A variety of techniques for technology mapping have been described in the published literature. For example, one may refer to Keutzer et al., "Dagon: Technology Binding and Local Optimization by DHE Matching", Proceedings of the 24th Design Automation Conference, Miami, Fla., June 1987, pages 341–347; Detjiens et al., "Technology Mapping in MIS", proceedings of ICCAD, Santa Clara, Calif., November 1987, pages 116–119; Hachtel et al., "Techmap: Technology Mapping with Delay and Area Optimization", Proceedings of the International Workshop on Logic and Architectural Synthesis for Silicon Compilers, Grenoble, May 1988; and Jit Sing et al., "Timing Optimization of Combinational Logic", proceedings of ICCAD, Santa Clara, Calif., November 1988, pages 282–285.

The processes of minimization and optimization essentially require the programmed machine to compute such things as the area occupied by a provisional layout of an integrated circuit and to determine, according to certain algorithms, whether a different layout achieves, for example, a smaller area of occupation. Alternatively, a given programme may be arranged to minimize time delays or variations in time delays.

Whatever may be the particular reason for an optimization or minimization routine, the programmed machine has recourse to a multiplicity of cells in the cell library, which defines each cell in terms of function and various time delays relevant to the operation of the cell. These delays are, in general, different in nature and magnitude for each cell.

It is known to characterise silicon cell libraries under so called "standard" conditions using a circuit simulator or by means of empirical determination. The obtaining of performance parameters for each cell in a library is a very time consuming operation. It is normal, as illustrated hereinafter with reference to a few selected cells, to specify the time delays in respect of each output relative to each possible input affecting that output. Where the cell library has, typically, hundreds of different cells, the setting up of the library and the provision of characteristic delays and performance parameters is, as mentioned, extremely time consuming.

In practical circumstances however, the conditions under which the final integrated circuit is to operate or is to be fabricated may be different to those for which the performance of the cells is specified. In particular the operating conditions (such as reference voltages and the mean temperature) or the fabrication process variations may be different. In order to compensate for such changes in conditions, it is possible to apply to all the parameters of the cells in the cell library a common scaling factor so that, for example, where TCHR is a characterised delay under the standard or worst case conditions, then a scale factor (S) would be used to determine the delay under the new conditions, the delay TNEW being equal to TCHR*S. The particular scaling factor employed may be selected from memory in accordance with a menu of selectable conditions, including both standard and non-standard conditions, which are to determine the scaling factor.

However, such a scheme is unsatisfactory, because the results are frequently too conservative, resulting in unnecessary loss of performance in the final circuit, or too optimistic, resulting in for example too small safety margins or unrealizable specifications of performance.

SUMMARY OF THE INVENTION

The main basis of the present invention is to provide a suite or set of scaling factors such that different factors are used for different types of measurement and/or different cells.

One broad division of types of measurement, for the purpose of generating different scaling factors according to the invention, is a division into two groups, namely (i) propagation delays and (ii) fatal input timing relationships. A 'propagation delay' (PD) denotes the time taken for a signal to travel from a specified input point to a specified output point. A 'fatal input timing relationship' (FITR) denotes the relationship in time that must exist between, for example, two or more input signals for the circuit or cell to operate properly. We postulate that the difference in nature of the measurement justifies the use of different scaling factors.

As will be seen later, the two groups, propagation delays and fatal input timing measurements, may be subdivided further. A convenient division of the former is between 'low-to-high' propagation delays and 'high-to-low' propagation delays. A convenient division of fatal input timing relationships is into the groups of (i) 'set-up' times; (ii) 'hold' times; and (iii) 'release' times.

Another important aspect of the invention concerns a division into types of cell. One teaching of the present invention is that the aforementioned propagation delays and fatal input timing relationships may usefully be scaled according to certain broad groupings of cells. One possible grouping provides for the following groups: (i) simple gates, having only one level of logic between the or each input and the output; (ii) complex gates, having more than one level of logic but no memory; and (iii) storage or memory elements. A justification for this classification is that, for example, propagation delays of the different types of cell will respond differently to different operating conditions. The greatest difference will usually be between those classified as simple gates and complex gates, owing to the different number of logic levels. Both types of gate can in general be expected to respond differently than storage elements.

The foregoing classification is not the only one possible. It may for example be appropriate to add a further group or groups relating to tristate buffers: just as there are preferably two types of propagation delay one may postulate different scale factors for tristate enable times and tristate disable times and one may classify buffers separately from simple gates, complex gates and storage elements. Alternatively, since buffers usually have only one level of logic, it would usually be acceptable to classify buffers as simple gates.

An important cause underlying the classifications envisaged by the present invention is the different manner in which, for example, 'propagation delays' and fatal input timing relationships are obtained the members that represent propagation delays are conveniently obtained as coefficients of first-order models of the respective cells. A circuit simulator such as SPICE may be run under different conditions to enable the derivation of the coefficients for the model. Such a model will provide only an approximation of the true performance. On the other hand, it is necessary to measure fatal input timing relationships they, unlike propagation delays, are independent of loading on the output of the circuit or cell.

Differences between sub-classes of the same broad class are mainly dependent on the choice of technical realization. For example, the differences between low-to-high propagation delays and high-to-low propagation delays are mainly due to 10 the different characteristics of p-channel devices, which pull up the outputs and are mostly responsible for the low-to-high transition delays, and n-channel devices, which pull down the outputs and are mainly responsible for the high-to-low transition lines.

As mentioned previously, some devices Justify a separate classification. For example output buffers and level shifters may have their timings referenced to an absolute voltage level instead of voltages relative to VDD. These cells will require to be scaled differently as operating conditions (such as VDD) change.

The present invention also provides for non-linear scaling of the parameters of storage elements, such as flip-flops, latches, counters and memories. These elements have propagation delays but the operating characteristics of such storage elements are normally defined additionally in terms of setup, hold and release times. Together, these times define a window around a clock transition time during which input data must not change. Otherwise, the output of the storage element is undefined. When characterising the setup, hold and release times for a storage element, a computation is made from a circuit simulation or from actual empirical measurements made on a cell fabricated according to the selected technology. The times determined for the parameters are then normally increased by a safety margin. The result is a characterised setup, hold or release parameter (hereinafter termed 'storage timing parameter').

If the characterised times are multiplied by a common scale factor, the results are inaccurate because the safety margin is multiplied by the scale factor.

According to another aspect of the invention a storage timing parameter may be scaled by subtracting a predetermined safety margin, multiplying the result by a scale factor and then reinserting a safety margin.

A further aspect of the invention concerns the employment of a piece-wise linear scaling factor. We have found that for a given type of parameter (usually a delay time) the scale factor for a small value in general may be different than for a large value. It is proposed therefore to employ a piece-wise linear approach such that for parameters less than a predetermined value, one scale factor is employed and for parameters greater than a predetermined time another scale factor is employed.

BRIEF DESCRIPTION OF THE ACCOMPANYING DRAWINGS

FIG. 1 herein shows in symbolic form a five-input NAND gate representing a typical simple gate in a cell library. FIG. 1A is a timing diagram for the gate shown in FIG. 1.

FIG. 3 illustrates symbolically a one-bit binary full adder.

FIG. 4 illustrates a D-type flip-flop with preset and clear.

FIG. 4A illustrates a timing diagram for the flip-flop shown in FIG. 4.

FIG. 5 illustrates a TTL output only pad.

FIG. 5A illustrates a timing diagram for the output pad shown in FIG. 5.

DETAILED DESCRIPTION

1. Introduction

It will be assumed in the following that the reader is familiar with the organisation and operation of a compiler or other similar programmed device for the synthesizer of large scale integrated circuits, particularly those employed for digital signal processing. The prior art aforementioned gives a comprehensive understanding of such compilers.

It will also be presumed that the reader is familiar with the nature and use of cell libraries either in conjunction with a compiler or synthesizer or otherwise. One typical library which is commercially available and which is suitable for the practice of the present invention is the 1.0 micron CMOS VSC 320 portable library available from VLSI Technology Inc., San Jose, Calif.

2. General

Figure 6:
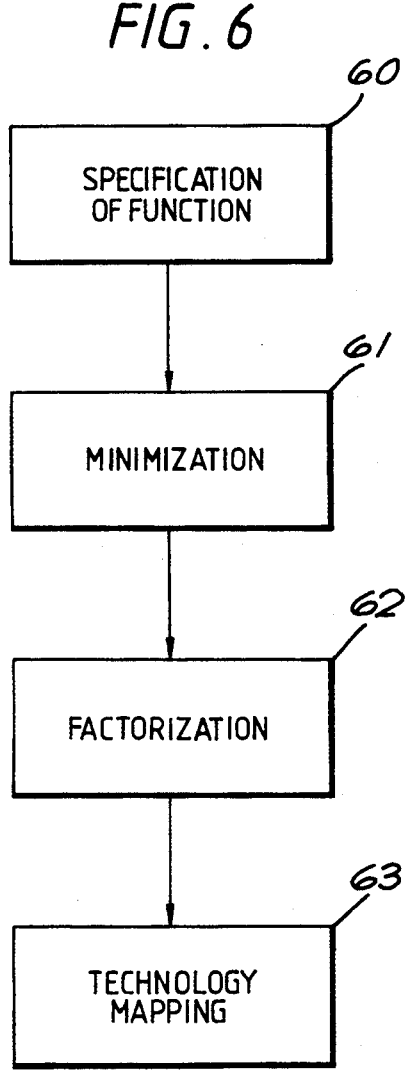
FIG. 6 is a diagram illustrating the general operation of a compiler.
Figure 7:
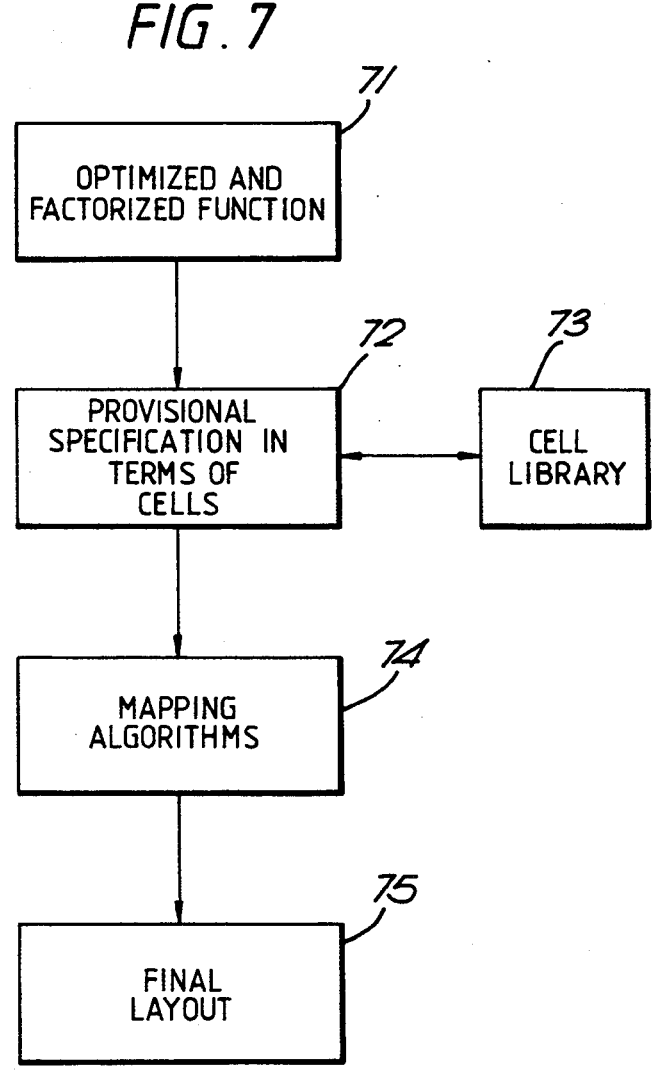
FIG. 7 is a diagram illustrating the use of a cell library.
Figure 8A:
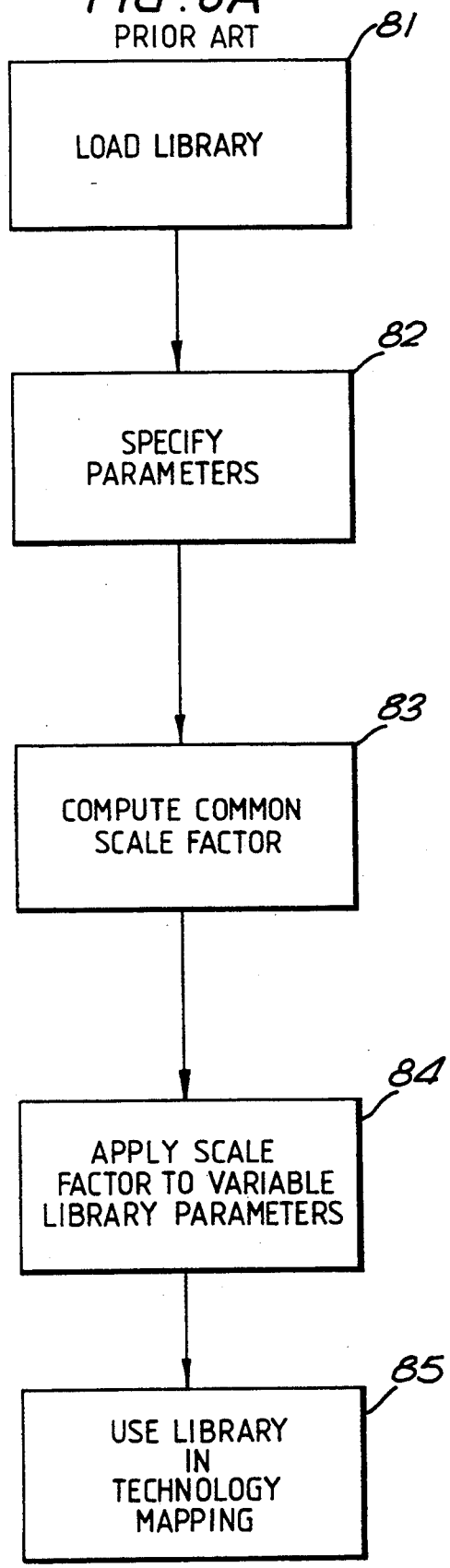
FIGS. 8A and 8B are diagrams illustrating the use of a common scale factor and a suite of scale factors respectively.
Figure 8B:
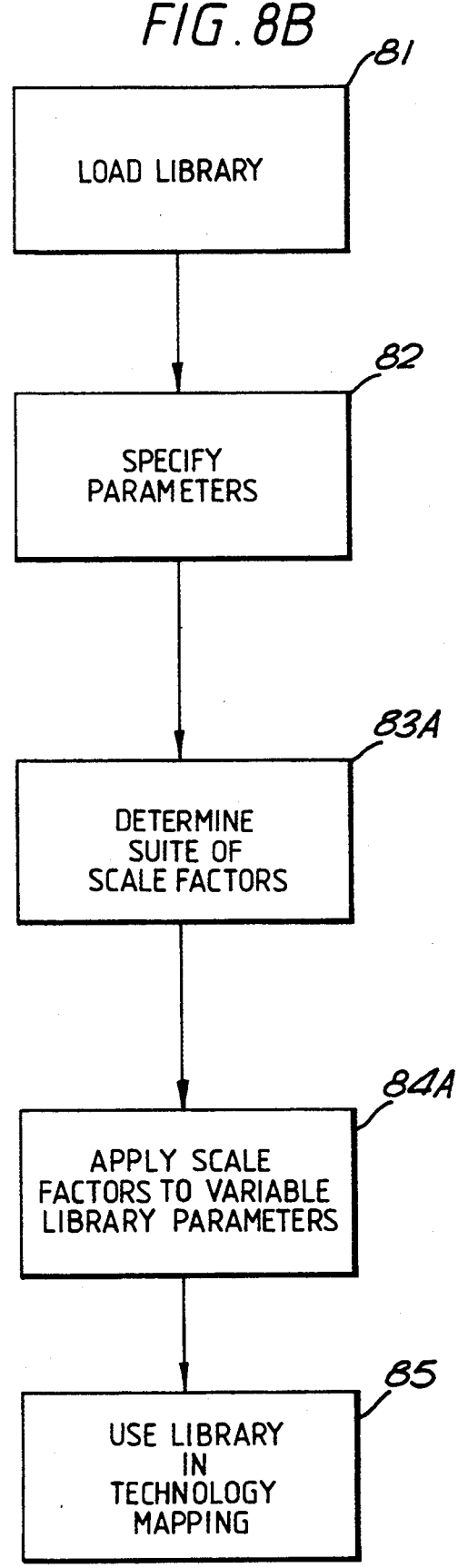

For the sake of completeness, the general operation of a compiler and its relation to a cell library is illustrated generally in FIGS. 6 and 7.

With reference to FIG. 6, the operation of the compiler begins with the specification of function which the designer desires should be implemented by, for example, a digital data processor. Such processors are characterised by very high throughput and great complexity. The specification of function, indicated by reference 60, typically takes the form of a set of Boolean expressions.

There follow, in general, the stages of minimization 61 and factorization 62. The purpose of these stages in the programmed operation of the compiler or synthesizer is to achieve a functional statement which is generally adapted for implementation by means of standard circuits or cells.

A final stage 63 in the operation of the compiler is the stage of technology mapping wherein the functional description of the data processor which is to be synthesized is ultimately converted into a detailed specification or template for the specific integrated circuit which will constitute the physical embodiment of the processor.

The stage 63 illustrated generally as technology mapping comprises, as shown in FIG. 7, a process from an optimized and factorized function (71) to a final layout (75) by way of intermediate stages which for the sake of simplicity are denoted, respectively, as a provisional specification (72) in terms of cells and mapping algorithms (74). Different programmed procedures may be organised in different ways but generally speaking the procedure requires the retrieval from a cell library (73) data which defines the function, physical attributes and other parameters, such as operational delays, of each of the circuits represented by the cells. The compiler produces a layout which is provisional in the sense that further optimization is required in order to achieve a more efficient layout; for example the area of silicon may be minimized or timing delay may be minimized.

The mapping algorithms may take many forms and are described generally in the prior art mentioned above. A specific example of an algorithm which achieves a minimization of timing delay in a gating system is described in U.S. patent application Ser. No. 356023 filed 23 May 1989 by Franck Poirot and assigned to the same assignee as the present application.

As mentioned previously, the cells in the library are characterised under specific conditions. These conditions may be regarded as the rated conditions.

If the conditions of use of the data processor or the fabrication method is such that the conditions for which the cell library is characterised are no longer true, the attributes or parameters relevant to the library must be changed. Two important examples are operating voltage and junction temperature. The rated conditions may be specified as a worst (i.e. lowest) voltage of 4.75 volts and a worst (i.e. highest) junction temperature of 70 degrees Celsius. These conditions would be specified in the compilation of the cell library.

Of course, the physical attributes relevant to any cell in the library are not all susceptible to change. For example, the area occupied by the physical embodiment of the cell is not normally variable. Fundamentally, the present invention relates to the parameters or numerical attributes which specify time delay between one event and another associated with the cells.

Various methods of providing a suite of scale factors will now be discussed.

3. Variation of Scale Factor with Type

It is possible to classify cells in several ways. For each set of groups one may choose a suite of scaling factors. In practice this technique may readily be combined with the foregoing.

One grouping of cells is as follows:
(i) Simple gates and buffers, i.e. cells which have only one level of logic. One example is a NAND gate.

(ii) Complex gates, which perform simple gating functions, but which have more than one level of logic. One example is an AND gate realized as a NAND gate followed by an inverter.

(iii) Functions: those cells which implement complex logic functions but have no memory or storage. One example is a one-bit adder.

(iv) Functions having memory: examples are latches, flip-flops and counters.

If desired one may add a fifth group:

(v) Output buffers.

Figure 1:
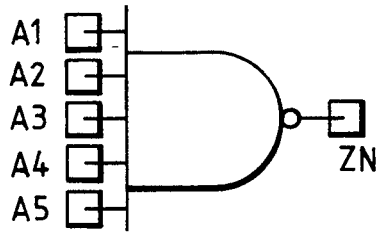
Figure 1A:
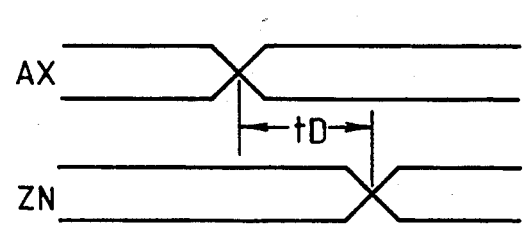

Examples of each of these types are (i) the NAND gate shown in FIG. 1; (ii) the AND-OR-INVERT gate shown in FIG. 2; (iii) the one bit adder shown in FIG. 3; (iv) the D-type flip-flop shown in FIG. 4; and (v) the tristate output buffer shown in FIG. 5.

4. Variation of Scaling Factors with Measurement Type

There are three broad types of measurement for the cells in a library, of which two have distinct species. These types are (i) propagation delays; (ii) set-up/hold-/release times and if desired (iii) tristate delay times. In practice there are more types because propagation delays for low to high transitions in MOS technology in particular and in semiconductor technology in general are different from propagation times for high to low transitions. These of delays are the most common and are multicomponent delays in that, in general, they comprise at least one component which is intrinsic, i.e. not dependent on load and a component which is dependent on load. Moreover, tristate enable times differ from tristate disable times and likewise are partly intrinsic and partly dependent on load.

The delay times are caused, in general, by different physical processes within the circuit elements. Thus it is feasible to use different scaling factors for the different types of measurement.

This scheme is not entirely independent of the previous one. For example, set-up, hold and release times mentioned in this section are possessed only by memory elements, which are a distinct class according to the previous scheme. Furthermore, this type of delay time may be specially treated, as indicated in the next section.

5. Variation of Scaling Factor for Storage Timing Parameters

Set-up, hold and release times, conveniently generically termed storage timing memory parameters, form a window before and after a storage element is clocked. During the window asynchronous inputs to the cell must not change. The memory window is usually determined by making interative circuit simulations to provide a memory delay and adding a safety margin to constitute the respective storage timing parameter. According to one aspect of the invention only the memory delay component is scaled and the safety factor is reinserted.

6. Piece-Wise Linear Scaling

We have found that in practice scale factors may vary according to the size of the parameter. If the same scale factor is used throughout the library then if it is accurate for small values of a parameter it is too conservative for high values, whereas if it is accurate for high values the low values cannot be guaranteed, particularly because low values have a larger relative dispersion.

Thus one may define a single factor S such that:

$$td\ (NEW) = S * td\ (OLD),$$

where td represents any time delay specified for a cell in the library and td (OLD) is the value characterised in the library. This factor S may be selected to minimize relative error for low values but, as noted above would be too conservative for high values.

It is preferably therefore to define for low values a scale factor $S_1$ such that:

$$td\ (NEW) = S_1 * td\ (OLD).$$

For high values one may use a factor $S_2$ given by:

$$td\ (NEW)\ S_2 * td + K,$$

where K represents an offset.

The scale factor $S_2$ may be selected to minimize absolute error for high values but would also be too conservative for low values. The switch over point (tsw), or transition between the linear portions, is given by:

$$S_1 * tsw = S_2 * tsw + offset.$$

7. An Exemplary Suite of Scaling Factors

A example of a suite of scaling factors is now given for the conditions and classifications stated.

(a) The cell-types are as in Section 3 above except that, for simplicity groups (ii) and (iii), namely complex gates and functions without memory are treated similarly and group (v) is ignored. Groups (ii) and (iii) are in general similar and the conditions governing group (v), output buffers are different from those governing groups (i) to (iv) inclusive.

(b) The measurement type classification is as in Section 4 above except that tristate delay times have been ignored, for the reasons given under (a) and propagation delays are subdivided into low-to-high propagation delays and high-to-low propagation delays.

(c) The standard conditions, namely Commercial Worst Case conditions are VDD=4.75 volts and Junction Temperature=70 degrees Celsius. The selected conditions for scaling are VDD=4.5 volts and Junction Temperature—125 degrees Celsius.

| Type of Cell | Scaling Factor |
| --- | --- |
| 7.1 Simple Gates | |
| 7.1.1. Low-to-High Propagation Delays | 1.269 |
| 7.1.2. High-to-Low Propagation Delays | 1.200 |
| 7.2 Functions and Complex Gates | |
| 7.2.1. Low-to-High Propagation Delays | 1.251 |
| 7.2.2. High-to-Low Propagation Delays | 1.207 |
| 7.3 Storage Elements | |
| 7.3.1. Low-to-High Propagation Delays | 1.251 |
| 7.3.2. High-to-Low Propagation Delays | 1.232 |
| 7.3.3. Setup/Hold/Release Times | 1.243 |

It will be observed that there is substantial variation according to type of measurement for the same type of cell and according to type of cell for the same type of measurements.

Specific examples of the variations under Section 6 above will not be given because they are highly dependent on the particular values of the storage times.

8. Specific Examples of Cells

(A) A SIMPLE GATE

An example of a simple gate viz., a NAND gate, implementing only one level of logic is shown in FIG. 1. This gate 1 has five inputs designated A1, A2, A3, A4 and A5 and a single output ZN.

A truth table for the gate is shown in Table 1A wherein L represents the low logic state, H represents the high logic state and X is an indeterminate or "don't care" state.

TABLE 1A

| INPUTS | | | | | OUTPUT |
|---|---|---|---|---|---|
| A1 | A2 | A3 | A4 | A5 | Z |
| L | X | X | X | X | H |
| X | L | X | X | X | H |
| X | X | L | X | X | H |
| X | X | X | L | X | H |
| X | X | X | X | L | H |
| H | H | H | H | H | L |

A description of the "pins" or terminals of the gate shown in FIG. 1 and Table 1A is shown in Table 1B in terms of the name of the PIN, the type, the capacitance in picofarads, and the description of the "pin". These capacitances may be determined empirically. As may be seen, each of the data input pins has a capacitance of 0.1 picofarads and the output pin has a capacitance of 0.08 picofarads.

TABLE 1B

| NAME | TYPE | CAPACITANCE (pF) | DESCRIPTION |
|---|---|---|---|
| A1 | Input | 0.12 | Data Input |
| A2 | Input | 0.11 | Data Input |
| A3 | Input | 0.12 | Data Input |
| A4 | Input | 0.11 | Data Input |
| A5 | Input | 0.11 | Data Input |
| ZN | output | 0.08 | Data Output |

This form of cell has only two kinds of delay, namely propagation delay for a low to high transition and a propagation delay for a high to low transition, conveniently termed 'RISE' and 'FALL'.

Propagation delays are partly dependent on load and accordingly are best specified by performance equations as shown in Table 1C.

TABLE 1C

| tD. A1/A2/etc->ZN (RISE) | 2.0 + 0.3 + 3.4 * Cld |
|---|---|
| (FALL) | 3.5 + 0.1 + 1.5 * Cld |

The propagation delay tD is as shown in FIG. 1B. Each propagation delay has three components. Considering first the "rise time", i.e. the propagation delay from low to high, a first component, in this example 2.0 nanoseconds, is an intrinsic or internal delay. This delay is not dependent on any capacitance. The second component depends on the output pin capacitance. The third component depends on the load capacitance (which may change according to the network) and is conveniently presumed to be the product of a coefficient, in this example 3.4 and the load capacitance, Cld.

Table 1D shows, for this exemplary gate, values of the propagation delays in nanoseconds for various values of the load capacitance. For example $[2.0+0.3+(3.4\times0.1)]=2.6$ nanoseconds is the value of tD, the propagation delay for the low to high transition when the load capacitance is 0.1 pF. Similarly the fall time is given as 3.8 nanoseconds.

TABLE 1D

| | Cld = 0.1 | | Cld = 0.2 | | Cld = 0.5 | | Cld = 1.0 | |
|---|---|---|---|---|---|---|---|---|
| | RISE | FALL | RISE | FALL | RISE | FALL | RISE | FALL |
| tD | 2.6 | 3.8 | 3.0 | 3.9 | 4.0 | 4.4 | 5.7 | 5.1 |

Each of these propagation delays may be scaled according to the factors 7.1.1 or 7.1.2 as the case may be for the particular conditions given in Section 7.

(B) A COMPLEX GATE

Figure 2:
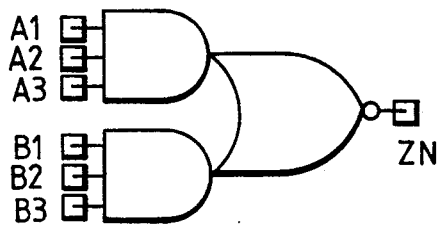
FIG. 2 illustrates an AND-OR-INVERT.
Figure 2A:
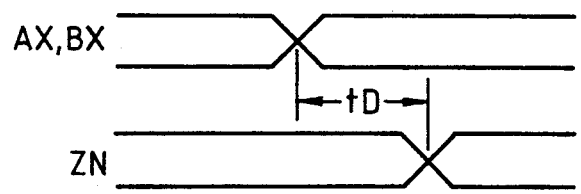
FIG. 2A is a timing diagram for the gate shown in FIG. 2.

The gate shown in FIG. 2 is a complex gate, i.e. a gate having more than one layer of logic. The schematic for the gate, a AND-OR-INVERT gate is shown in FIG. 2A. This gate has three inputs to each of two AND gates and provides the complex function NOT [(A1.A2.A3)+(B1.B2.B3)]. A truth table for the gate is shown in Table 2A.

TABLE 2A

| INPUTS | | | | | | OUTPUT |
|---|---|---|---|---|---|---|
| A1 | A2 | A3 | B1 | B2 | B3 | ZN |
| X | X | L | X | X | L | H |
| X | X | L | X | L | X | H |
| X | X | L | L | X | X | H |
| X | L | X | X | X | L | H |
| X | L | X | X | L | X | H |
| X | L | X | L | X | X | H |
| L | X | X | X | X | L | H |
| L | X | X | X | L | X | H |
| L | X | X | L | X | X | H |
| H | H | H | X | X | X | L |
| X | X | X | H | H | H | L |

The PIN description of the gate is shown in Table 2B.

TABLE 2B

| NAME | TYPE | CAPACITANCE (pF) | DESCRIPTION |
|---|---|---|---|
| A1 | Input | 0.10 | Data Input |
| A2 | Input | 0.10 | Data Input |
| A3 | Input | 0.10 | Data Input |
| B1 | Input | 0.10 | Data Input |
| B2 | Input | 0.10 | Data Input |
| B3 | Input | 0.10 | Data Input |
| ZN | Output | 0.16 | Data Output |

Even complex gates such as this have no memory or tristate function and possess only the two types of propagation delay. The propagation delays are similar for each input to output path. The propagation delays are defined by performance equations as set out in Table 2C.

TABLE 2C

| tD. A1/A2/A3/B1/B2/B3->ZN (RISE) | 1.1 + 0.6 + 3.9 * Cld |
|---|---|
| (FALL) | 1.2 + 0.5 + 3.3 * Cld |

The propagation delays for sample loads of 0.1, 0.2, 0.5 and 1.0 picofarads are shown in Table 2D.

TABLE 2D

|    | Cld = 0.1 | | Cld = 0.2 | | Cld = 0.5 | | Cld = 1.0 | |
|----|------|------|------|------|------|------|------|------|
|    | RISE | FALL | RISE | FALL | RISE | FALL | RISE | FALL |
| tD | 2.1  | 2.0  | 2.5  | 2.3  | 3.7  | 3.3  | 5.6  | 5.0  |

Each of these propagation delays may for example be scaled according to Section 7.2 above.

(C) FUNCTIONS WITHOUT MEMORY

Figure 3A:
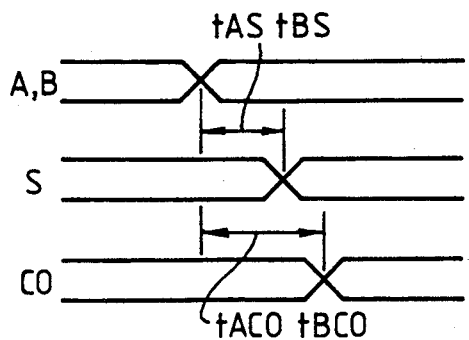
FIG. 3A illustrates a timing diagram for the full adder shown in FIG. 3.
Figure 3A:
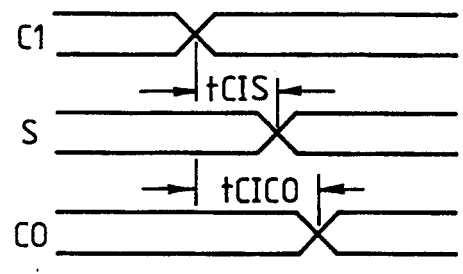

This type of device will normally possess propagation delays and may-have tristate enable or disable times but is distinct from functions of the next following type in that there is no set-up, hold or release time. One example, as shown in FIG. 3, is a one-bit binary full adder. The function table or truth table for the adder is set out in Table 3A.

TABLE 3A

| INPUTS | | | OUTPUTS | |
|---|---|---|---|---|
| CI | A | B | CO | S |
| L | L | L | L | L |
| L | L | H | L | H |
| L | H | L | L | H |
| L | H | H | H | L |
| H | L | L | L | H |
| H | L | H | H | L |
| H | H | L | H | L |
| H | H | H | H | H |

The PIN description of the adder is shown in Table 3B.

TABLE 3B

| NAME | TYPE | CAPACITANCE (pF) | DESCRIPTION |
|---|---|---|---|
| A  | Input  | 0.31 | Data Input |
| B  | Input  | 0.30 | Data Input |
| CI | Input  | 0.33 | Data Input |
| S  | Output | 0.08 | Data Output |
| CO | Output | 0.08 | Data Output |

As before, the performance equations are set out in Table 3C and the propagation delays for sample loads in pF are set out in Table 3D.

TABLE 3C

| tAS   | A->S   | (RISE) | 4.1 + 0.2 + 3.0 * Cld |
|       |        | (FALL) | 4.5 + 0.1 + 1.4 * Cld |
| tBS   | B->S   | (RISE) | 3.9 + 0.2 + 3.0 * Cld |
|       |        | (FALL) | 4.1 + 0.1 + 1.4 * Cld |
| tCIS  | CI->S  | (RISE) | 1.6 + 0.2 + 3.0 * Cld |
|       |        | (FALL) | 1.7 + 0.1 + 1.4 * Cld |
| tACO  | A->CO  | (RISE) | 1.7 + 0.2 + 3.0 * Cld |
|       |        | (FALL) | 2.0 + 0.1 + 1.4 * Cld |
| tBCO  | B->CO  | (RISE) | 1.7 + 0.2 + 3.1 * Cld |
|       |        | (FALL) | 2.2 + 0.1 + 1.4 * Cld |
| tCICO | CI->CO | (RISE) | 0.9 + 0.2 + 3.1 * Cld |
|       |        | (FALL) | 1.7 + 0.1 + 1.4 * Cld |

The propagation delays are as illustrated in FIG. 1B.

TABLE 3D

|       | Cld = 0.1 | | Cld = 0.2 | | Cld = 0.5 | | Cld = 1.0 | |
|-------|------|------|------|------|------|------|------|------|
|       | RISE | FALL | RISE | FALL | RISE | FALL | RISE | FALL |
| tAS   | 4.6  | 4.7  | 4.9  | 4.8  | 5.8  | 5.3  | 7.3  | 6.0  |
| tBS   | 4.4  | 4.4  | 4.7  | 4.5  | 5.6  | 4.9  | 7.1  | 5.6  |
| tCIS  | 2.2  | 1.9  | 2.5  | 2.1  | 3.4  | 2.5  | 4.9  | 3.2  |
| tACO  | 2.2  | 2.3  | 2.5  | 2.4  | 3.5  | 2.8  | 5.0  | 3.5  |
| tBCO  | 2.2  | 2.4  | 2.5  | 2.6  | 3.4  | 3.0  | 5.0  | 3.7  |
| tCICO | 1.4  | 1.9  | 1.7  | 2.1  | 2.6  | 2.5  | 4.2  | 3.2  |

Each of these propagation delays may be scaled according to Section 7.2 above.

(D) FUNCTIONS WITH MEMORY

Devices classed as functions with memory include latches, flip-flops (bistables) and counters and are the only ones to possess set-up, hold and release times. As explained previously, these storage timing parameters are constituted differently from propagation delays or tristate parameters. This justifies the use of different scale factors whether a classification by type of cell or type of measurement is used. FIG. 4 shows in this example a D-type flip-flop with preset and clear. This particular flip-flop is a positive-edge-triggered D flip-flop with an active low clear, designated CDN, and an active low preset designated SDN. The clock input CP and the output Q and QN are buffered. In the operation of this gate, data present at the D-input during the positive edge of the clock pulse is transferred to the Q output, the converse being transferred to the QN output.

This element has no tristate times but does have propagation delays as well as storage timing parameters.

TABLE 4A

| INPUTS | | | | OUTPUTS | |
|---|---|---|---|---|---|
| CDN | SDN | CP | D | Q | QN |
| L | H | X | X | L | H |
| H | L | X | X | H | L |
| H | H | ⌐ | L | L | H |
| H | H | ⌐ | H | H | L |
| H | H | L | X | Q | QN |
| H | H | H | X | Q | QN |
| L | L | X | X | L | L |

Table 4B illustrates the PIN description of the flip-flop shown in FIG. 4.

TABLE 4B

| NAME | TYPE   | CAPACITANCE (pF) | DESCRIPTION |
|------|--------|------|----------------------|
| D    | Input  | 0.10 | Data Input           |
| CP   | Input  | 0.10 | Clock Input          |
| SDN  | Input  | 0.22 | PRESET Input (active LOW) |
| CDN  | Input  | 0.21 | CLEAR Input (active LOW) |
| Q    | Output | 0.08 | Data Output          |
| QN   | Output | 0.08 | Complementary Data Output |

The performance equations and propagation delays for sample loads in respect of the flip-flop as set out in Tables 4C and 4D respectively.

TABLE 4C

| tQ. | CP->Q | (RISE) | 4.4 + 0.2 + 3.1 * Cld |
|---|---|---|---|
| | | (FALL) | 5.2 + 0.1 + 1.3 * Cld |
| tSQ. | SDN->Q | | 2.6 + 0.2 + 3.0 * Cld |
| tCQ. | CDN->Q | | 1.5 + 0.1 + 1.4 * Cld |
| tQN. | CP->QN | (RISE) | 3.9 + 0.2 + 3.1 * Cld |
| | | (FALL) | 3.7 + 0.1 + 1.7 * Cld |
| tSQN. | SDN->QN | | 1.8 + 0.1 + 1.3 * Cld |
| tCQN. | CDN->QN | | 3.6 + 0.2 + 3.0 * Cld |

The meanings of the various parameters are indicated in FIG. 4B.

TABLE 4D

| | Cld = 0.1 | | Cld = 0.2 | | Cld = 0.5 | | Cld = 1.0 | |
|---|---|---|---|---|---|---|---|---|
| | RISE | FALL | RISE | FALL | RISE | FALL | RISE | FALL |
| tQ | 5.0 | 5.5 | 5.3 | 5.6 | 6.2 | 6.0 | 7.7 | 6.7 |
| tSQ | 3.1 | | 3.4 | | 4.3 | | 5.9 | |
| tCQ | | 1.8 | | 1.9 | | 2.3 | | 3.0 |
| tQN | 4.5 | 3.9 | 4.8 | 4.1 | 5.7 | 4.6 | 7.2 | 5.4 |
| tSQN | | 2.1 | | 2.2 | | 2.6 | | 3.3 |
| tCQN | 4.1 | | 4.4 | | 5.3 | | 6.9 | |

These propagation delays would be, for example, scaled according to Section 7.3.1 and 7.3.2 above.

As mentioned, the element has set-up, hold and release times tS, tH and tRel. These are as indicated in FIG. 4B and the characterised values are listed in Table 4E.

TABLE 4E

| tS. D->CP | 2.0 ns |
|---|---|
| tRelS. SDN->CP | 0.0 ns |
| tRelC. CDN->CP | 1.6 ns |
| tH = tHC. CP->D/CDN | 0.0 ns |
| tHS. CP->SDN | 2.5 ns |

These storage parameters may be for example scaled according to Section 7.3.3 above.

(E) OUTPUT BUFFERS

An example of a buffer is shown in FIG. 5 which is a three state TTL output pad macro with an 8 mA drive. Table 5A is a truth table of the output only pad.

TABLE 5A

| INPUTS | | PAD |
|---|---|---|
| OEN | I | PAD |
| H | X | Z |
| L | L | L |
| L | H | H |

A PIN description for the output pad macro is set out in Table 5B.

TABLE 5B

| NAME | TYPE | CAPACITANCE (pF) | DESCRIPTION |
|---|---|---|---|
| PAD | Output | 3.23 | 3-State Input |
| I | Input | 0.95 | Data Input |
| OEN | Input | 0.57 | 3-State Output Enable (active LOW) |

The performance equations of the pad are set out in Table 5C, the various parameters being as shown in FIG. 5B.

TABLE 5C

| tTTL. | I->PAD | (RISE) | 2.0 + 0.3 + 0.08 * Cld |
|---|---|---|---|
| | | (FALL) | 2.9 + 0.3 + 0.10 * Cld |
| tOE. | OEN->PAD | (RISE) | 2.5 + 0.3 + 0.11 * Cld |

TABLE 5C-continued

| | | (FALL) | 2.3 + 0.4 + 0.13 * Cld |
|---|---|---|---|
| tOD. | OEN->PAD | | 2.5 + 0.0 + 0.00 * Cld |

The tristate enable and disable times tTTL and the propagation delays tOE and tOD for sample loads are set out in Table 5D.

TABLE 5D

| | Cld = 55 | | Cld = 105 | | Cld = 155 | |
|---|---|---|---|---|---|---|
| | RISE | FALL | RISE | FALL | RISE | FALL |
| tTTL | 6.8 | 8.8 | 10.9 | 13.9 | 15.0 | 19.0 |
| tOE | 8.7 | 9.7 | 14.0 | 16.0 | 19.3 | 22.4 |
| tOD | 2.5 | 2.5 | 2.5 | 2.5 | 2.5 | 2.5 |

These delays could be treated according to Section 7.1 above but different scaling may be selected if desired.

SUMMARY

From the illustrations of the various examples of cell and their different types of parameters it should be apparent that there are substantial benefits in using a suite of scaling factors and also in employing piecewise linear scale factors and partial scale factors, i.e. where only part of the parameter is subject to a scale factor.

We claim:

1. A method of operating a programmed data processor which computes, from an input specification of function defining a large scale integrated circuit, a netlist constituting a technology mapping of the said circuit in terms of a selected technical realization, said method including storing in a data storage device of said data processor a library comprising a multiplicity of sets of data each set of which defines a basic circuit cell and timing parameters thereof, the method further comprising scaling said timing parameters and computing said netlist employing the scaled timing parameters of selected cells, wherein the improvement comprises:

(1) defining in said data processor a suite comprising a plurality of scale factors for the timing parameters of the cells in the library;

(2) applying by means of said data processor the suite of scale factors to the respective timing parameters stored in said storage device; and (3) computing by means of the said processor the said netlist employing the selected cells having timing parameters scaled according to said suite of scaling factors.

2. A method according to claim 1 wherein the scale factors vary according to a classification of parameter.

3. A method according to claim 2 in which the timing parameters are classified in groups comprising (i) propagation delays; and (ii) storage timing parameters.

4. A method according to claim 3 in which the groups include a group of tristate operating parameters.

5. A method according to claim 1 wherein the scale factors vary according to a classification of cell.

6. A method according to claim 5 wherein the cells are classified in groups comprising (i) gates having a single layer of logic; (ii) gates having a plurality of layers of logic; (iii) complex functions without memory; and (iv) functions including memory.

7. A method according to claim 6 wherein groups (ii) and (iii) effectively constitute a single group saring a common scale factor.

8. A method according to claim 6 wherein the groups include a group of tristate devices.

9. A method according to claim 1 in which the suite of scale factors comprises a first scale factor and a second scale factor and further comprising:

scaling a delay parameter of a cell according as it is less than or greater than a selected threshold value.

10. A method of operating a programmed data processor which computes from an input specification of function defining a large scaled integrated circuit a netlist constituting a technology mapping of the said integrated circuit in terms of a selected technical realization, said method including storing in a data storage device of said processor a library comprising a multiplicity of sets of data each set of which defines a basic circuit cell and: timing timing parameters thereof, the method further comprising scaling said parameters and computing in said data processor said netlist employing the scaled timing parameters of selected cells, wherein the improvement comprises:

(1) defining a transition between a first range of small delay parameters and a second range of large delay parameters; and (2) applying by means of said data processor to the parameters a different scaling factor according as each timing parameter is within the said first range or within the said second range respectively.

11. A method of operating a programmed data processor which computes from a specification of function defining a large scale integrated circuit a netlist constituting a technology mapping of the said integrated circuit in terms of a selected technical realization, said method including storing in a data storage device of said data processor a library comprising a multiplicity of sets of data each set of which defines a basic circuit cell and timing parameters thereof, the parameters comprising storage timing parameters in respect of cells having a storage function, the storage timing parameters each consisting of a respective determined delay time and a respective safety margin, the method further comprising computing in said data processor new scaled values for said storage timing parameters and computing said netlist employing the new scaled values for said storage timing parameters of selected cells, wherein the said step of computing said new scaled values comprises:

changing each storage timing parameter into a new storage timing parameter consisting of (i) a multiplied form of the said respective determined delay time and (ii) the said respective safety margin.

12. A method of operating a cell library which stores data defining timing parameters for each of a multiplicity of cells representing basic circuit elements for a large scale integrated circuit, comprising the steps of:

(i) applying by means of a programmed data processor a suite of a plurality of scale factors to said timing parameters whereby some of said timing parameters are scaled differently to other timing parameters; and (ii) computing in said data processor a netlist of a large scale integrated circuit employing selected timing parameters scaled according to step (i).

13. A method according to claim 12 wherein the scale factors are different according to the magnitude of the said timing parameters.

14. A method according to claim 12 wherein the scale factors are different according to the type of cell.

15. A method according to claim 12 wherein the parameters are classified into groups each having a respective scale factor.

16. A method according to claim 15 wherein the groups comprise propagation delays and fatal input timing relationships respectively.

* * * * *